(12) United States Patent
Zhou et al.

(10) Patent No.: US 10,299,078 B2
(45) Date of Patent: May 21, 2019

(54) BLE-BASED POSITIONING METHOD AND APPARATUS

(71) Applicant: SHENZHEN GOODIX TECHNOLOGY CO., LTD., Shenzhen, Guangdong (CN)

(72) Inventors: Yonglin Zhou, Guangdong (CN); Fahai Chen, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/789,516

(22) Filed: Oct. 20, 2017

(65) Prior Publication Data

US 2018/0324553 A1 Nov. 8, 2018

Related U.S. Application Data

(63) Continuation of application No. PCT/CN2017/083507, filed on May 8, 2017.

(51) Int. Cl.
*H04W 24/00* (2009.01)
*H04W 4/02* (2018.01)
*G01S 5/02* (2010.01)
*H04W 4/80* (2018.01)

(52) U.S. Cl.
CPC ........... *H04W 4/027* (2013.01); *G01S 5/0252* (2013.01); *H04W 4/80* (2018.02)

(58) Field of Classification Search
CPC .................................................. H04W 4/027
See application file for complete search history.

(56) References Cited

U.S. PATENT DOCUMENTS

| 2014/0135042 A1* | 5/2014 | Buchheim | G01S 1/68 |
| | | | 455/456.6 |
| 2014/0370917 A1 | 12/2014 | Buchheim et al. | |
| 2018/0041985 A1* | 2/2018 | Davaadorj | H04W 64/003 |
| 2018/0063814 A1* | 3/2018 | Yuan | H04W 68/005 |

FOREIGN PATENT DOCUMENTS

| CN | 102854491 A | 1/2013 |
| CN | 103235283 A | 8/2013 |
| CN | 104270710 A | 1/2015 |

OTHER PUBLICATIONS

Search Report for corresponding European Patent Application No. EP 17 77 7765 dated Apr. 13, 2018.

* cited by examiner

*Primary Examiner* — Justin Y Lee
(74) *Attorney, Agent, or Firm* — Heslin Rothenberg Farley & Mesiti P.C.

(57) ABSTRACT

A BLE-based positioning method is applied to a terminal device, and includes: calculating a change rule of the RSSI value when a received signal strength indication (RSSI) value obtained by parsing a received signal of a target BLE slave device is less than a predetermined threshold; and generating prompt information used for prompting a moving direction of the terminal device according to the change rule of the RSSI value until the RSSI value is greater than or equal to the predetermined threshold.

12 Claims, 6 Drawing Sheets

BLE-BASED POSITIONING METHOD AND APPARATUS

CROSS-REFERENCE TO RELATED APPLICATIONS

The present disclosure is a continuation of international application No. PCT/CN2017/083507, filed on May 8, 2017, which is hereby incorporated by reference in its entireties.

TECHNICAL FIELD

The present disclosure relates to the field of wireless communications, and in particular, to a Bluetooth low energy (BLE)-based positioning method and apparatus.

BACKGROUND

At present, a short-range wireless communications technology is widely applied to various electronic devices such as smart phones, smart bands, wearable devices, and sensors. These electronic devices support a positioning technology. Positioning means implementing location positioning in an indoor environment, and is mainly implemented by using an indoor location positioning system formed by integrating multiple technologies such as wireless communications, base station positioning, and inertial navigation positioning. In addition to a cellular positioning technology of a communication network, common indoor wireless positioning technologies further include: a WIreless Fidelity (WiFi), Bluetooth, infrared, ultra wide band (UWB), radio frequency identification (RFID), ZigBee, ultrasonic wave, and the like.

The existing positioning methods are mostly performed by a mobile device-based positioning system including a Bluetooth AP and a server. In such method, positioning means that the mobile device repeatedly transmits, by using a transmission and communication network constructed by the Bluetooth AP, advertising information to the server for communication, and the server calculates according to the advertising information to obtain location information of the mobile device and sends the location information to the mobile device. Alternatively, the positioning methods are performed by an iBeacon-based Bluetooth positioning system. The positioning system includes an iBeacon information release system, an iBeacon base station, and a mobile device. The information release system includes a background management system, a service authentication interface, and a radio frequency antenna. The base station includes a data storage module and a Bluetooth radio frequency antenna. The mobile device includes a data processing module, a Bluetooth transceiver module, a wireless transceiver module, a Bluetooth radio frequency receiving antenna, and a wireless radio frequency transceiver antenna.

Many defects exist in the existing methods above: 1. A Bluetooth transmission and communication network is complex to construct and needs to deploy many Bluetooth Aps. Consequently, maintenance is inconvenient, and hardware costs are high. 2. A dedicated server is required to process data sent by a Bluetooth AP, causing data network delays and data bandwidth problems, and increasing system costs. 3. An adopted local positioning apparatus is fixed and not sufficiently flexible. Consequently, upgrade and modification of multiple positioning methods cannot be implemented. 4. Only the location of a mobile device is positioned, and a lost or hidden object cannot be positioned by using the mobile device during object search.

SUMMARY

Embodiments of the present disclosure is intended to provide a BLE-based positioning method and apparatus, so as to quickly find the location of a target BLE slave device, and greatly reduce the time taken to find the target BLE slave device. In addition, the target BLE slave device can be quickly positioned without deploying an iBeacon or a Bluetooth AP indoors, so that a complex data processing architecture is not required, and hardware costs are reduced.

To resolve the foregoing technical problems, an embodiment of the present disclosure provides a BLE-based positioning method, applied to a terminal device. The BLE-based positioning method includes: receiving a signal from the target BLE slave device after a target BLE slave device is obtained through scanning; parsing the received signal to obtain a received signal strength indication (RSSI) value; calculating a change rule of the RSSI value when the RSSI value is less than a predetermined threshold; and generating, according to the change rule of the RSSI value, prompt information used for prompting a moving direction of the terminal device until the RSSI value is greater than or equal to the predetermined threshold.

An embodiment of the present disclosure further provides a BLE-based positioning apparatus, applied to a terminal device. The BLE-based positioning apparatus includes: a scanning module, configured to scan a target BLE slave device; a receiving module, configured to receive a signal from the target BLE slave device after the target BLE slave device is obtained through scanning; a parsing module, configured to parse the received signal to obtain an RSSI value; a first determining module, configured to determine whether the RSSI value is less than a predetermined threshold; a calculation module, configured to calculate a change rule of the RSSI value when the RSSI value is less than the predetermined threshold; and a generation module, configured to generate, according to the change rule of the RSSI value, prompt information used for prompting a moving direction of the terminal device until the RSSI value is greater than or equal to the predetermined threshold.

Compared with the existing technology, in the embodiments of the present disclosure, after a target BLE slave device is obtained through scanning, a signal from the target BLE slave device is received; the received signal is parsed to obtain an RSSI value; when the RSSI value is less than a predetermined threshold, a change rule of the RSSI value is calculated; and prompt information used for prompting a moving direction of a terminal device is generated according to the change rule of the RSSI value until the RSSI value is greater than or equal to the predetermined threshold. When the RSSI value is greater than the predetermined threshold, it may be determined that the location of the target BLE slave device is found. Therefore, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

BRIEF DESCRIPTION OF THE DRAWINGS

One or more embodiments are exemplarily described by using figures that are corresponding to the embodiments in the accompanying drawings. The exemplary descriptions do not constitute a limitation to the embodiments. Elements with same reference numbers in the accompanying drawings indicate similar elements. Unless otherwise particularly stated, the figures in the accompanying drawings do not constitute a scale limitation.

DETAILED DESCRIPTION

To make the objectives, technical solutions and advantages of the present disclosure clearer, the following describes in detail embodiments of the present disclosure with reference to the accompanying drawings. A person of ordinary skill in the art may understand that, to make a reader better understand this application, many technical details are provided in the embodiments of the present disclosure. However, the technical solutions protected by the claims of this application can also be implemented even if without the technical details and various changes and modifications based on the following embodiments.

Figure 1:
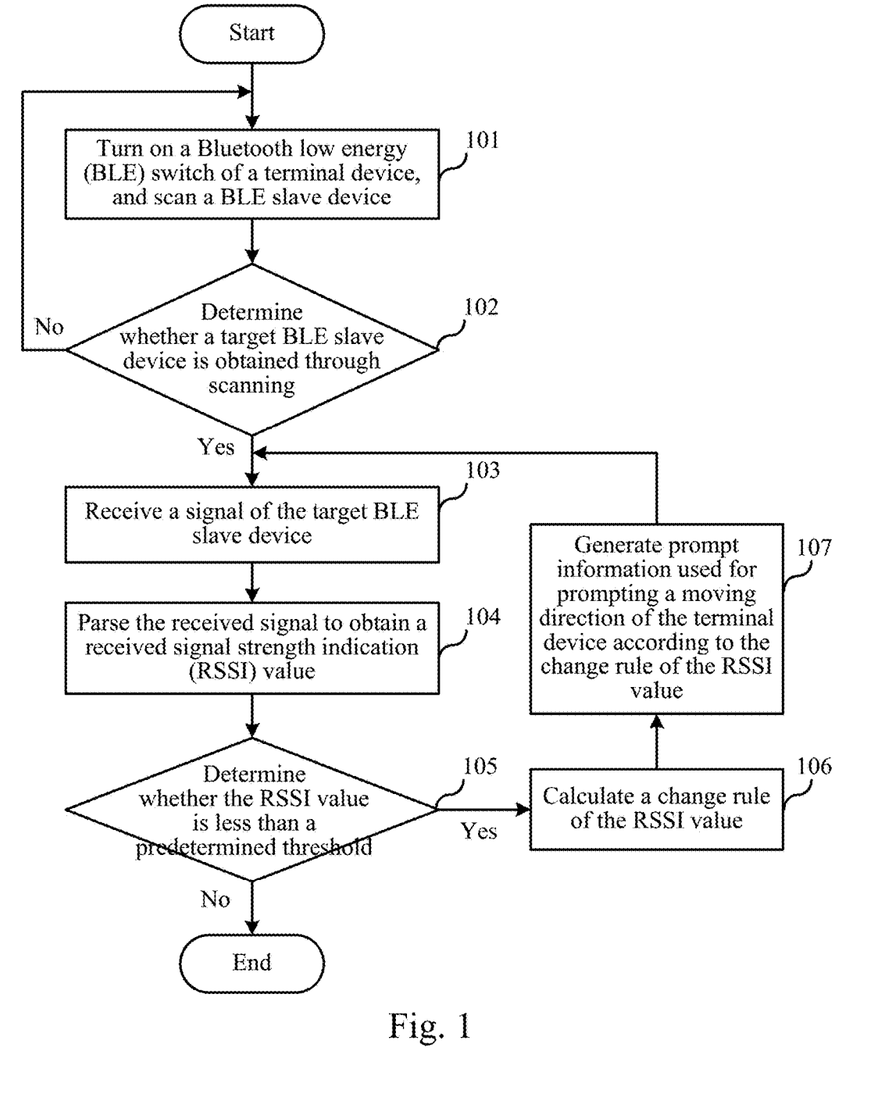
FIG. 1 is a flowchart of a BLE-based positioning method according to a first embodiment of the present disclosure.

A first embodiment of the present disclosure relates to a BLE-based positioning method applied to a terminal device. A specific procedure is shown in FIG. 1. The BLE-based positioning method includes the following steps.

Step 101: Turn on a BLE switch of the terminal device, and scan a BLE slave device.

It should be mentioned that the BLE slave device may be an intelligent device having a communication function. For example, the BLE slave device may be, but is not limited to, an active stylus. In addition, Bluetooth communication module of the BLE slave device and the terminal device may both support a Bluetooth4.1/4.2 protocol.

Specifically, a switch enabling key is set for the Bluetooth communication module of the terminal device. When the switch enabling key is triggered, the terminal device can search for a BLE slave device nearby. When searching for the BLE slave device, the terminal device may present search results in the form of a list. In addition, the list shows information of a BLE slave device, and the information may include, but is not limited to, a name, a physical address (MAC address), an RSSI value and the like.

Step 102: Determine whether a target BLE slave device is obtained through scanning; and if yes, go to step 103; otherwise, go back to step 101.

Specifically, a user may find the target BLE slave device needing to be searched for, from the list according to names or MAC addresses of BLE slave devices. A virtual button used for searching for the target BLE slave device is clicked. When receiving a search instruction for the target BLE slave device, the terminal device may determine that the target BLE slave device is obtained through scanning.

It should be noted that in an actual design process, the target BLE slave device may be obtained through scanning in another manner. For example, BLE slave devices maybe pre-stored in the terminal device. Before the BLE slave devices are scanned, a target BLE slave device is selected from the pre-stored BLE slave devices, and then the target BLE slave device is scanned.

In actual application, it should be mentioned that after the target BLE slave device is obtained through scanning, the user needs to click "search for the target BLE slave device", and then the following algorithm process is performed. When the user clicks "search for the target BLE slave device", that is, when the terminal device receives the search instruction, the terminal device receives a signal from the target BLE slave device. Alternatively, when the user clicks "search for the target BLE slave device", that is, when the terminal device receives the search instruction, the terminal device parses a received signal to obtain an RSSI value.

Step 103: Receive a signal from the target BLE slave device.

It should be mentioned that the terminal device communicates with the target BLE slave device by means of BLE. When a user uses the target BLE slave device, the terminal device needs to turn on Bluetooth communication module. Then, the terminal device performs pairing connection with the target BLE slave device, and the target BLE slave device is used to perform an operation on the terminal device after the connection succeeds. When the user does not use the target BLE slave device, the target BLE slave device is disconnected with the terminal device. In this case, the target BLE slave device is in an advertising state and periodically sends an advertising data packet. The terminal device is in a scanning state and sends a scan command, so as to find the target BLE slave device nearby and receive the advertising data packet sent by the target BLE slave device.

Step 104: Parse the received signal to obtain an RSSI value.

Step 105: Determine whether the RSSI value is less than a predetermined threshold; and if yes, go to step 106; otherwise, it indicates that the RSSI value is greater than or equal to the predetermined threshold, and it may be determined that the location of the target BLE slave device is in an area range of the terminal device, and the procedure ends.

Step 106: Calculate a change rule of the RSSI value.

For example, in a range of permitted errors, the change rule of the RSSI value may be that the RSSI value becomes larger, the RSSI value becomes smaller, the RSSI value remains unchanged, the RSSI value becomes larger first and then smaller, or the like.

Step 107: Generate prompt information used for prompting a moving direction of the terminal device according to the change rule of the RSSI value.

When the prompt information used for prompting the moving direction of the terminal device is generated, the terminal device displays the moving direction of itself. For example, the moving direction may be "moving forward", "moving backward", or "moving left/right". Specifically, the RSSI value changes when the distance between the terminal device and the target BLE slave device changes. Some examples are as follows.

First, during moving of the terminal device, if the RSSI signal becomes stronger, it indicates that the change rule of the RSSI value is that the RSSI value becomes larger. Therefore, it indicates that the terminal device moves towards the target BLE slave device, and the target BLE slave device is located in the moving direction of the terminal device. A user may be prompted to "move forward", so as to help the user control the terminal device at a new location to obtain more accurate data. This helps to quickly find the target BLE slave device.

Second, if the RSSI signal becomes weaker, it indicates that the change rule of the RSSI value is that the RSSI value becomes smaller. Therefore, it indicates that the terminal device moves away from the target BLE slave device, and the target BLE slave device is located in a direction opposite to the moving direction of the terminal device. A user may be prompted to "move backward", so as to help the user control the terminal device at a new location to obtain more accurate data. This helps to quickly find the target BLE slave device.

Third, if the RSSI signal becomes stronger first and then weaker, it indicates that the target BLE slave device is located on either side of a moving route of the terminal device. A user may be prompted to "move left/right", so as to help the user control the terminal device at a new location to obtain more accurate data. This helps to quickly find the target BLE slave device.

It should be mentioned that after the terminal device moves to the new location, go back to step 103 to continue to receive the signal from the target BLE slave device until the RSSI value is greater than or equal to the predetermined threshold. In addition, it should be mentioned that during actual application, when the RSSI value reaches the predetermined threshold, the terminal device may further send trigger information to the target BLE slave device, to trigger the target BLE slave device to send alarm information. For example, the target BLE slave device may trigger, but is not limited to triggering, a motor, a buzzer, or an LED lamp of the target BLE slave device to work. When hearing vibration sound of the motor or sound of the buzzer, the user may quickly find the target BLE slave device.

It is not difficult to find from the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

A second embodiment of the present disclosure relates to a BLE-based positioning method. The second embodiment is an improvement based on the first embodiment.

Figure 2:
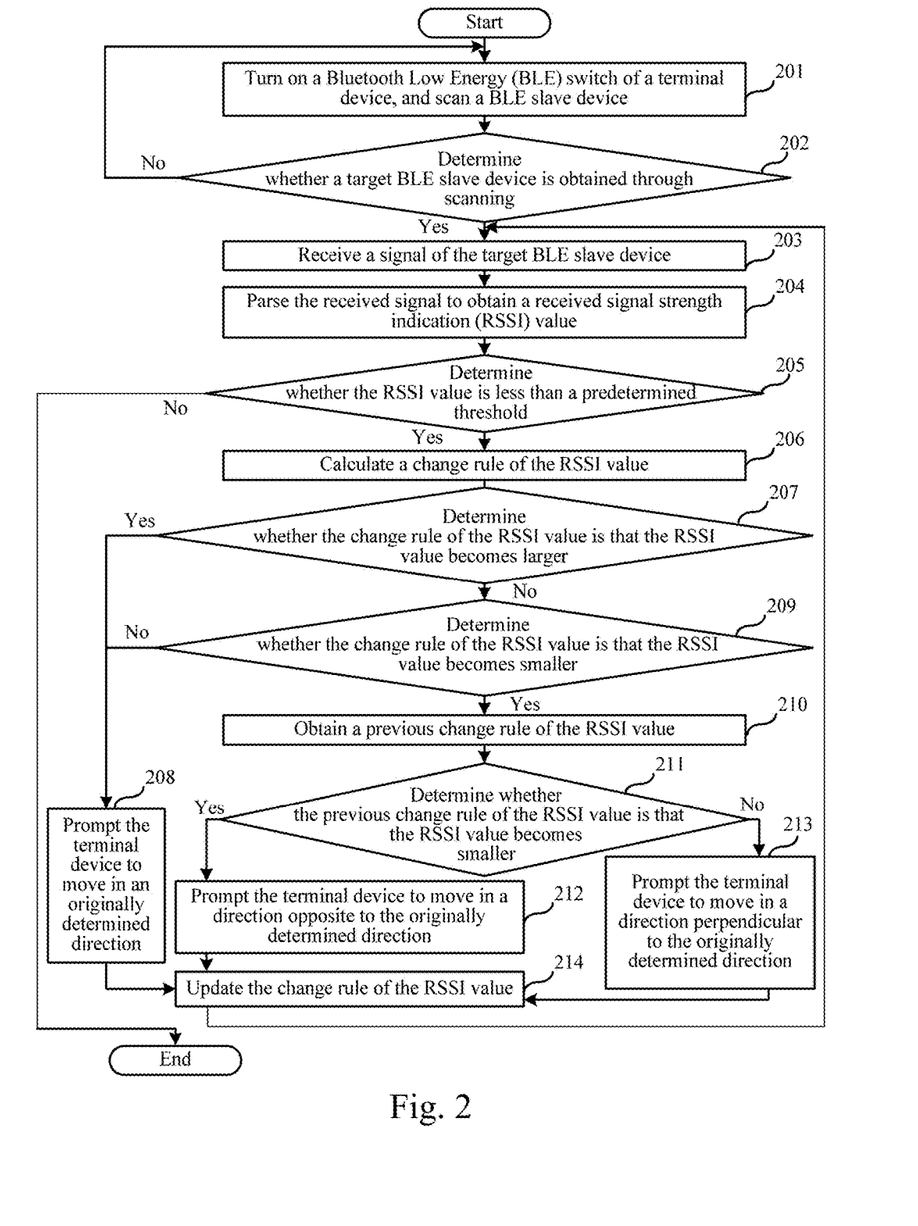
FIG. 2 is a flowchart of a BLE-based positioning method according to a second embodiment of the present disclosure.

A specific procedure is shown in FIG. 2. The BLE-based positioning method includes the following steps.

Step 201 to step 206 are the same as step 101 to step 106 in the first embodiment, and details are not described herein again.

Step 207: Determine whether the change rule of the RSSI value is that the RSSI value becomes larger; and if yes, go to step 208; otherwise, go to step 209.

A difference between a previous RSSI value and a current RSSI value is calculated. When the difference is greater than a predetermined value, the change rule of the RSSI value is that the RSSI value becomes larger. When the difference is less than the predetermined value, the change rule of the RSSI value is that the RSSI value becomes smaller. It should be mentioned that the predetermined value is usually set to 0. That is, when the difference between the previous RSSI value and the current RSSI value is greater than 0, it indicates that the change rule of the RSSI value is that the RSSI value becomes larger. When the difference between the previous RSSI value and the current RSSI value is less than 0, it indicates that the change rule of the RSSI value is that the RSSI value becomes smaller. However, during actual measurement, the RSSI value is not stable in the measurement process and an error exists. Therefore, during actual application, an absolute value of the predetermined value may be set to a fixed value greater than 0. The fixed value is represented by $\varepsilon$. When the difference between the previous RSSI value and the current RSSI value is greater than $\varepsilon$, the change rule of the RSSI value is that the RSSI value becomes larger. When the difference between the previous RSSI value and the current RSSI value is less than $-\varepsilon$, the change rule of the RSSI value is that the RSSI value becomes smaller.

In addition, it should be noted that in a same design, multiple groups of $\varepsilon$ values maybe pre-stored. For example, a larger RSSI value indicates a more accurate measured RSSI value and a smaller error of $\varepsilon$. A smaller RSSI value indicates a less accurate measured RSSI value and a larger error of $\varepsilon$. Therefore, RSSI values may be grouped in advance, and each group of RSSI values corresponds to a different $\varepsilon$ value, to reduce the error and enable a user to find the target slave device more quickly.

Step 208: Prompt the terminal device to move in an originally determined direction.

During actual application, the terminal device displays the moving direction of itself. Specifically, the RSSI value changes when the distance between the terminal device and the target BLE slave device changes. For example, during moving of the terminal device, if the RSSI signal becomes stronger, it indicates that the change rule of the RSSI value is that the RSSI value becomes larger. Therefore, it indicates that the terminal device moves towards the target BLE slave device, and the target BLE slave device is located in the moving direction of the terminal device. A user may be prompted to "move forward", so as to help the user control the terminal device at a new location to obtain more accurate data. This helps to quickly find the target BLE slave device.

Step 209: Determine whether the change rule of the RSSI value is that the RSSI value becomes smaller; and if yes, go to step 210; otherwise, it indicates that the change rule of the RSSI value is 0, that is, the RSSI value does not change, and go to step 208 to prompt the terminal device to move in the originally determined direction.

Step 210: Obtain a previous change rule of the RSSI value.

Step 211: Determine whether the previous change rule of the RSSI value is that the RSSI value becomes smaller; and if yes, go to step 212; otherwise, go to step 213.

Step 212: Prompt the terminal device to move in a direction opposite to the originally determined direction.

During actual application, the terminal device displays the moving direction of itself. Specifically, the RSSI value changes when the distance between the terminal device and the target BLE slave device changes. For example, during moving of the terminal device, if the RSSI signal becomes weaker, it indicates that the change rule of the RSSI value is that the RSSI value becomes smaller. Therefore, it indicates that the terminal device moves away from the target BLE slave device, and the target BLE slave device is located in the direction opposite to the moving direction of the terminal device. A user may be prompted to "move backward", so as to help the user control the terminal device at a new location to obtain more accurate data. This helps to quickly find the target BLE slave device.

Step 213: Prompt the terminal device to move in a direction perpendicular to the originally determined direction.

During actual application, the terminal device displays the moving direction of itself. Specifically, the RSSI value changes when the distance between the terminal device and the target BLE slave device changes. For example, during moving of the terminal device, if the RSSI signal becomes stronger first and then weaker, it indicates that the target BLE slave device is located on either side of a moving route of the terminal device. A user may be prompted to "move left/right", so as to help the user control the terminal device at a new location to obtain more accurate data. This helps to quickly find the target BLE slave device.

It should be noted that to ensure a correct rotation angle when the terminal device changes direction, after the prompt information used for prompting the moving direction of the terminal device is generated, the rotation angle of the terminal device maybe indicated by using a magnetometer or an acceleration sensor of the terminal device.

It should be mentioned that step 214 is performed after each of step 208, step 212, and step 213.

Step 214: Update the change rule of the RSSI value.

It should be mentioned that after the terminal device moves to a new location and the change rule of the RSSI value is updated, go back to step 203 to continue to receive the signal from the target BLE slave device until the RSSI value is greater than or equal to the predetermined threshold.

It is not difficult to find from the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

A third embodiment of the present disclosure relates to a BLE-based positioning method. The third embodiment is an improvement based on the first or second embodiment.

Figure 3:
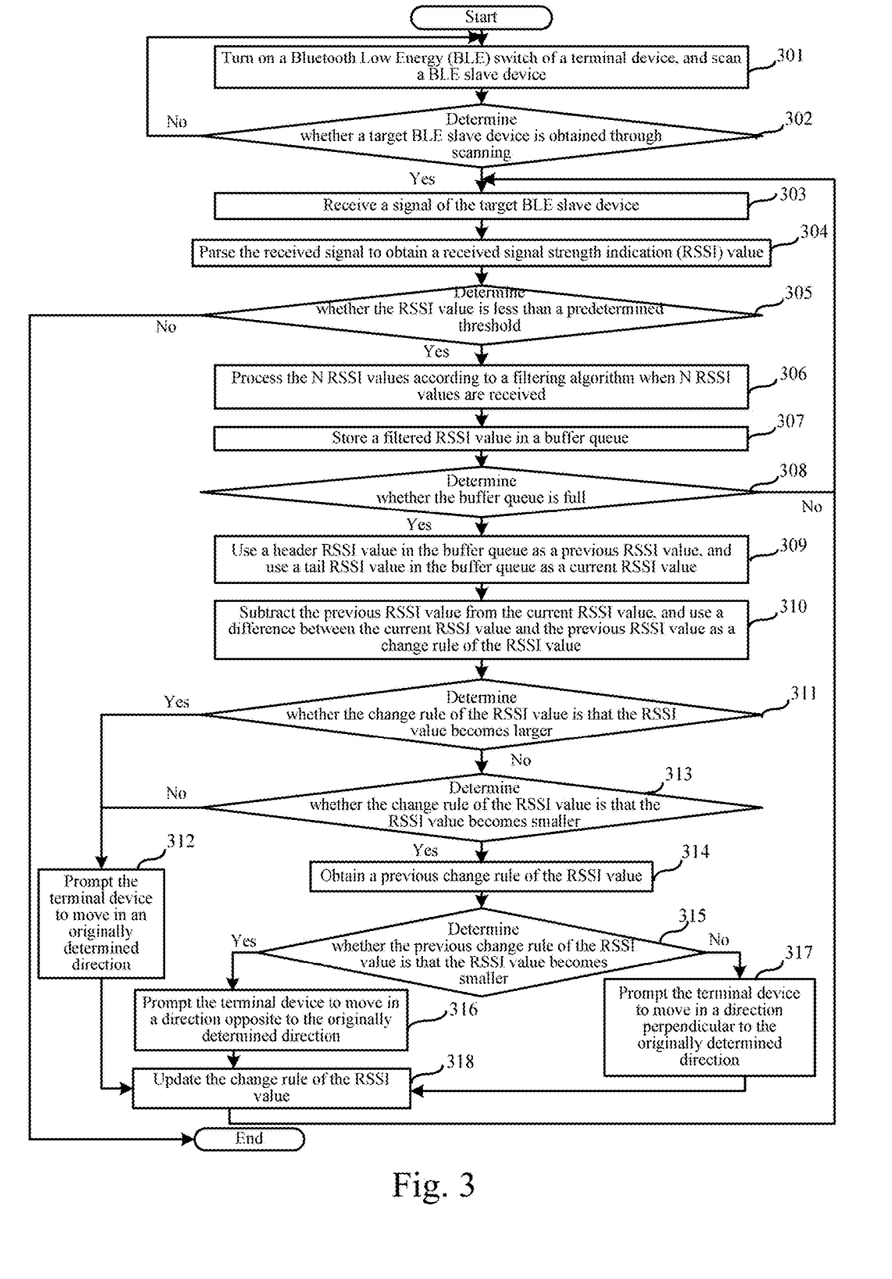
FIG. 3 is a flowchart of a BLE-based positioning method according to a third embodiment of the present disclosure.

Specifically, when obtaining the RSSI value in data sent by the BLE slave device, the terminal device may be affected in two aspects. First, different BLE slave devices have different periods of sending an advertising data packet. Therefore, the terminal device has different speeds of obtaining an RSSI value. Second, an environment has relatively great impact on fluctuation of the RSSI value. For example, RSSI values obtained at different time points at a same location are different.

To reduce the impact in the two aspects, a step of pre-processing the obtained RSSI value and the step of calculating the change rule of the RSSI value are further described in this embodiment. Specifically, a buffer queue used for dynamically storing at least two RSSI values may be predetermined. Specifically, the buffer queue may dynamically change. It should be mentioned that a buffer queue used for dynamically storing five RSSI values may be predetermined in this embodiment. However, this embodiment is not limited to store five RSSI values. The buffer queue may store, in sequence, RSSI values obtained by the terminal device. If the buffer queue has stored five RSSI values in sequence, when the terminal device obtains the sixth RSSI value, the five RSSI values already stored in the buffer queue are moved one unit forward in sequence for storing the sixth RSSI value.

A specific procedure is shown in FIG. 3. The BLE-based positioning method includes the following steps.

Step 301 to step 305 are the same as step 101 to step 105 in the first embodiment, and details are not described herein again.

Step 306: When N RSSI values are received, process the N RSSI values according to a filtering algorithm.

Specifically, the filtering algorithm is calculating an average value of the N RSSI values when N RSSI values are received, or calculating a median of the N RSSI values when N RSSI values are received, or calculating an average value or a median of the remaining RSSI values when N RSSI values are received and after the largest RSSI value and/or the smallest RSSI value is removed from five RSSI values. The obtained average value or median is a filtered RSSI value, where N is a positive integer greater than 1.

Step 307: Store a filtered RSSI value in a buffer queue.

Step 308: Determine whether the buffer queue is full; and if yes, go to step 309; otherwise, go back to step 303 to continue to receive the signal from the target BLE slave device.

Step 309: Use a header RSSI value in the buffer queue as a previous RSSI value, and use a tail RSSI value in the buffer queue as a current RSSI value.

It should be mentioned that during actual application, the terminal device frequently receives signals sent by the BLE slave device and parses the signals to obtain RSSI values. If each time an RSSI value is obtained by means of parsing, a difference between the RSSI value and an adjacent previous RSSI value is calculated, power consumption of the terminal device is increased. In addition, the current RSSI value and the adjacent previous RSSI value are caused to be roughly the same. Consequently, a change rule of the RSSI value cannot be accurately calculated. Therefore, the Mth RSSI value immediately previous to the current RSSI value are used as the previous RSSI value, and a difference between the previous RSSI value and the current RSSI value is calculated. In this embodiment, the buffer queue has a length of 5, that is, M=4.

Step 310: Subtract the previous RSSI value from the current RSSI value, and use a difference between the current RSSI value and the previous RSSI value as a change rule of the RSSI value.

Step 311 to step 318 are the same as step 207 to step 214 in the second embodiment, and details are not described herein again.

It is not difficult to find from the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

Step division of the foregoing methods is merely for clear description, and the steps maybe combined into one step or some steps maybe divided into multiple steps during embodiment. Steps including a same logic relationship all fall within the protection scope of the present disclosure. Any unnecessary modification added in the algorithm or procedure or unnecessary design introduced without changing the core design of the algorithm and procedure falls within the protection scope of the present disclosure.

Figure 4:
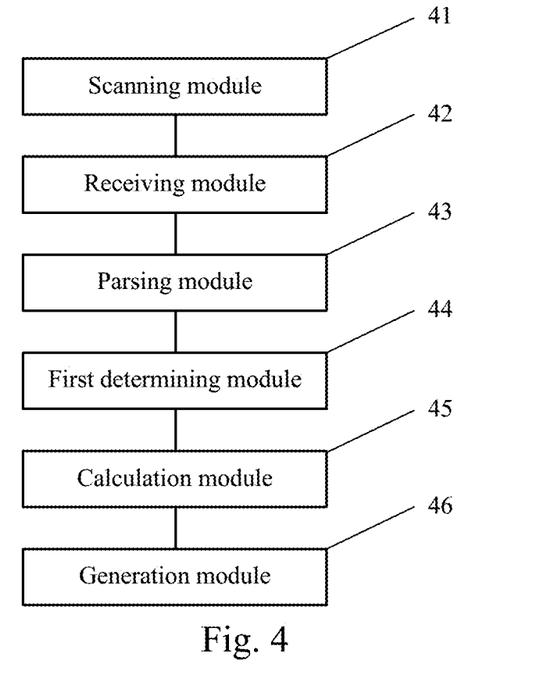
FIG. 4 is a block diagram of a BLE-based positioning apparatus according to a fourth embodiment of the present disclosure.

A fourth embodiment of the present disclosure relates to a BLE-based positioning apparatus. As shown in FIG. 4, the BLE-based positioning apparatus is applied to a terminal device, and includes: a scanning module 41, configured to scan a target BLE slave device; a receiving module 42, configured to receive a signal from the target BLE slave device after the target BLE slave device is obtained through scanning; a parsing module 43, configured to parse the received signal to obtain an RSSI value; a first determining module 44, configured to determine whether the RSSI value is less than a predetermined threshold; a calculation module

45, configured to calculate a change rule of the RSSI value when the RSSI value is less than the predetermined threshold; and a generation module 46, configured to generate prompt information used for prompting a moving direction of the terminal device according to the change rule of the RSSI value, until the RSSI value is greater than or equal to the predetermined threshold.

It is not difficult to find that this embodiment is an apparatus embodiment corresponding to the first embodiment, and this embodiment may be implemented in coordination with the first embodiment. Related technical details mentioned in the first embodiment are still effective in this embodiment. To reduce repetition, details are not described herein again. Correspondingly, related technical details mentioned in this embodiment may also be applied to the first embodiment.

It is not difficult to find from the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

It should be mentioned that the modules in this embodiment are all logical modules. During actual application, a logical unit may be a physical unit, or may be part of a physical unit, or may be implemented as a combination of multiple physical units. In addition, to highlight the innovative part of the present disclosure, units that are not closely related to solution of the technical problem proposed in the present disclosure are not described in this embodiment. However, this does not mean that no other units exist in this embodiment.

A fifth embodiment of the present disclosure relates to a BLE-based positioning apparatus. The fifth embodiment is an improvement based on the fourth embodiment.

Figure 5:
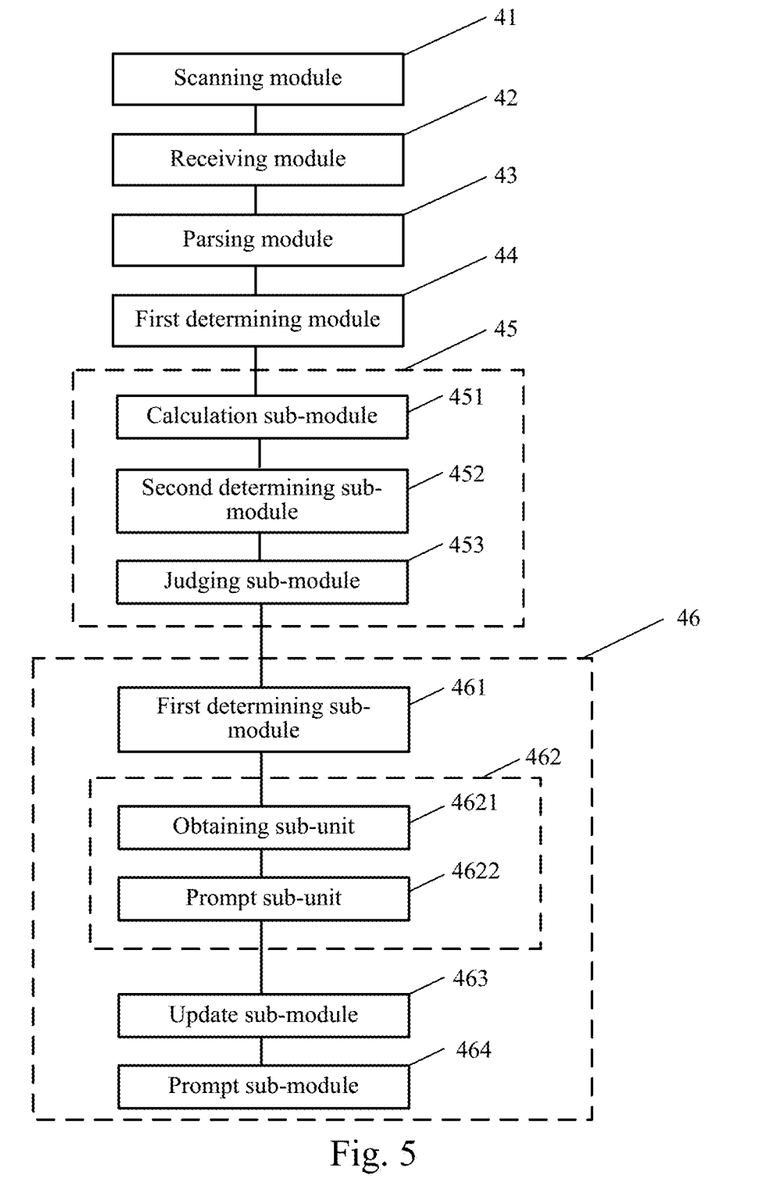
FIG. 5 is a block diagram of a BLE-based positioning apparatus according to a fifth embodiment of the present disclosure.

As shown in FIG. 5, a scanning module 41, a receiving module 42, a parsing module 43, a first determining module 44, a calculation module 45, and a generation module 46 in this embodiment are the same as the modules in the fourth embodiment, and details are not described herein again.

In addition, the generation module 46 includes: a first determining sub-module 461, configured to determine whether the change rule of the RSSI value is that the RSSI value becomes larger; a prompt sub-module 462, configured to prompt the terminal device to move in an originally determined direction when the change rule of the RSSI value is that the RSSI value becomes larger; and an update sub-module 463, configured to update the change rule of the RSSI value; a prompt sub-module 464, configured to prompt the terminal device to move in another direction when the change rule of the RSSI value is that the RSSI value becomes smaller.

In addition, the prompt sub-module 462 includes: an obtaining sub-unit 4621, configured to obtain a previous change rule of the RSSI value when the change rule of the RSSI value is that the RSSI value becomes smaller; and a prompt sub-unit 4622, configured to prompt the terminal device to move in a direction opposite to the originally determined direction when the previous change rule of the RSSI value is that the RSSI value becomes smaller, while prompt the terminal device to move in a direction perpendicular to the originally determined direction when the previous change rule of the RSSI value is that the RSSI value becomes larger.

In addition, the calculation module 45 includes: a calculation sub-module 451, configured to calculate a difference between a previous RSSI value and a current RSSI value; a second determining sub-module 452, configured to determine whether the difference is greater than a predetermined value; and a judging sub-module 453, configured to determine that the change rule of the RSSI value is that the RSSI value becomes larger when the difference is greater than the predetermined value, while determine that the change rule of the RSSI value is that the RSSI value becomes smaller when the difference is less than the predetermined value.

In addition, to ensure a correct rotation angle when the terminal device changes direction, the BLE-based positioning apparatus further includes an angle obtaining module, configured to indicate the rotation angle of the terminal device by using a magnetometer or an acceleration sensor after the prompt information used for prompting the moving direction of the terminal device is generated.

The second embodiment and this embodiment correspond to each other. Therefore, this embodiment may be implemented in coordination with the second embodiment. Related technical details mentioned in the second embodiment are still effective in this embodiment, and technical effects achieved in the second embodiment can also be implemented in this embodiment. To reduce repetition, details are not described herein again. Correspondingly, related technical details mentioned in this embodiment may also be applied to the second embodiment.

It is not difficult to find by means of the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

A sixth embodiment of the present disclosure relates to a BLE-based positioning apparatus. The sixth embodiment is an improvement based on the fourth or fifth embodiment.

Figure 6:
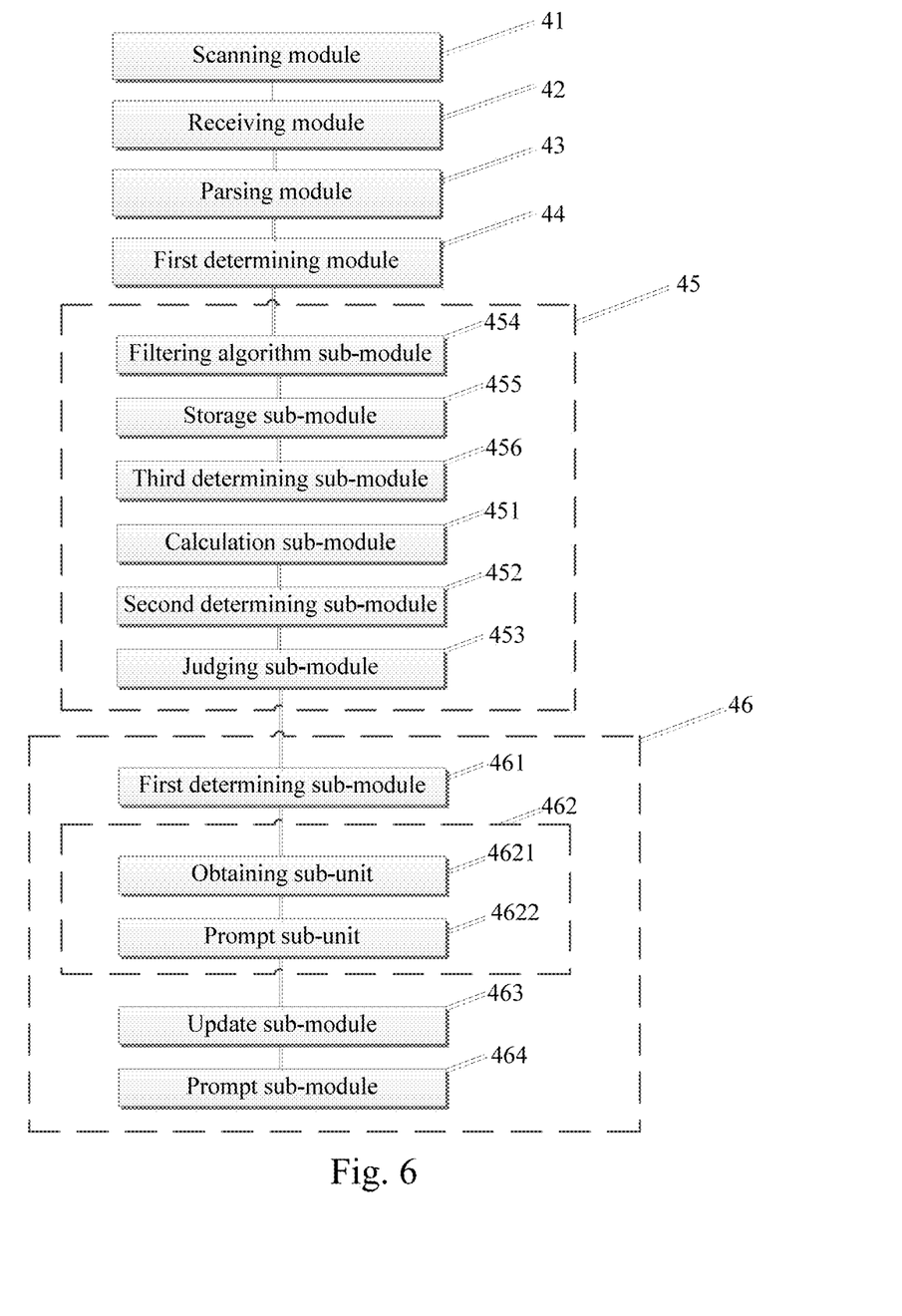
FIG. 6 is a block diagram of a BLE-based positioning apparatus according to a sixth embodiment of the present disclosure.

As shown in FIG. 6, a scanning module 41, a receiving module 42, a parsing module 43, a first determining module 44, a calculation module 45, a generation module 46, a first determining sub-module 461, a prompt sub-module 462, an update sub-module 463, a prompt sub-module 464, an obtaining sub-unit 4621, a prompt sub-unit 4622, a calculation sub-module 451, a second determining sub-module 452, and a judging sub-module 453 in this embodiment are the same as the modules in the fifth embodiment, and details are not described herein again. In addition, the calculation module 45 further includes a filtering algorithm sub-module 454, configured to process the N RSSI values according to a filtering algorithm when N RSSI values are received, to obtain an average value of the N RSSI values, where N is a positive integer greater than 1. Specifically, that the filtering algorithm processing sub-module is configured to process the N RSSI values according to a filtering algorithm when N RSSI values are received is specifically: calculating an average value of the N RSSI values when N RSSI values are received, or calculating a median of the N RSSI values when N RSSI values are received, or calculating an average value or a median of the remaining RSSI values when N RSSI values are received and after the largest value and/or the smallest value is removed from the N RSSI values.

The calculation module 45 further includes: a storage sub-module 455, configured to preset a buffer queue used for dynamically storing at least two RSSI values, and store a filtered RSSI value in the buffer queue before the change rule of the RSSI value is calculated and when the RSSI value is less than the predetermined threshold; and a third determining sub-module 456, configured to determine whether the buffer queue is full. When the buffer queue is full, the calculation sub-module 451 uses a header RSSI value in the buffer queue as the previous RSSI value, uses a tail RSSI value in the buffer queue as the current RSSI value, and calculates a difference between the previous RSSI value and the current RSSI value.

The third embodiment and this embodiment correspond to each other. Therefore, this embodiment may be implemented in coordination with the third embodiment. Related technical details mentioned in the third embodiment are still effective in this embodiment, and technical effects achieved in the third embodiment can also be implemented in this embodiment. To reduce repetition, details are not described herein again. Correspondingly, related technical details mentioned in this embodiment may also be applied to the third embodiment.

It is not difficult to find by means of the foregoing content that, by means of this embodiment, the location of the target BLE slave device can be quickly found, and the time taken to find the target BLE slave device is greatly reduced. In addition, the target BLE slave device can be quickly positioned without deploying an iBeacon or a Bluetooth AP indoors, so that a complex data processing architecture is not required, and hardware costs are reduced.

A person skilled in the art may understand that all or some steps in the methods in the foregoing embodiments may be implemented by a program instructing relevant hardware. The program is stored in a storage medium, and includes several instructions used for enabling a device (which may be a Microcontroller, a chip, or the like) or a processor to perform all or some steps in the methods in the embodiments of this application. The storage medium includes any medium that can store program code, such as a USB flash disk, a mobile hard disk, a read-only memory (ROM), a random access memory (RAM), a magnetic disk, or an optical disc.

A person of ordinary skill in the art may understand that the foregoing embodiments are specific embodiments for implementing the present disclosure. During actual application, various changes can be made in forms and details without departing from the spirit and scope of the present disclosure.

What is claimed is:

1. A Bluetooth low energy (BLE)-based positioning method, applied to a terminal device, wherein the BLE-based positioning method comprises:
   receiving a signal from a target BLE slave device after the target BLE slave device is obtained through scanning;
   parsing the received signal to obtain a received signal strength indication (RSSI) value;
   calculating a change rule of the RSSI value when the RSSI value is less than a predetermined threshold; and
   generating prompt information used for prompting a moving direction of the terminal device according to the change rule of the RSSI value until the RSSI value is greater than or equal to the predetermined threshold;
   wherein the generating of prompt information used for prompting a moving direction of the terminal device according to the change rule of the RSSI value, specifically comprises:
   prompting the terminal device to move in an originally determined direction, and updating the change rule of the RSSI value when the change rule of the RSSI value is that the RSSI value becomes greater; or
   prompting the terminal device to move in another direction, and updating the change rule of the RSSI value when the change rule of the RSSI value is that the RSSI value becomes smaller;
   wherein the prompting of the terminal device to move in another direction when the change rule of the RSSI value is that the RSSI value becomes smaller, specifically comprises:
   obtaining a previous change rule of the RSSI value when the change rule of the RSSI value is that the RSSI value becomes smaller; and
   prompting the terminal device to move in a direction opposite to the originally determined direction when the previous change rule of the RSSI value is that the RSSI value becomes smaller; or prompting the terminal device to move in a direction perpendicular to the originally determined direction when the previous change rule of the RSSI value is that the RSSI value becomes larger.

2. The BLE-based positioning method according to claim 1, wherein, after the generating of prompt information used for prompting a moving direction of the terminal device, the method further comprises:
   indicating a rotation angle of the terminal device by using a magnetometer or an acceleration sensor.

3. The BLE-based positioning method according to claim 1, wherein the calculating of a change rule of the RSSI value, specifically comprises:
   calculating a difference between a previous RSSI value and a current RSSI value; wherein the change rule of the RSSI value is that the RSSI value becomes larger when the difference is greater than a predetermined value, while the change rule of the RSSI value is that the RSSI value becomes smaller when the difference is less than a predetermined value.

4. The BLE-based positioning method according to claim 3, wherein, before the calculating of a difference between the previous RSSI value and the current RSSI value, the method further comprising:
   processing N RSSI values according to a filtering algorithm when the N RSSI values are received, wherein N is a positive integer greater than 1; and
   wherein the filtering algorithm specifically includes:
   calculating an average value of the N RSSI values when N RSSI values are received; or
   calculating a median of the N RSSI values when N RSSI values are received; or
   calculating an average value or a median of the remaining RSSI values when N RSSI values are received and after the largest value and/or the smallest value is removed from the N RSSI values.

5. The BLE-based positioning method according to claim 4, wherein the calculating of a difference between the previous RSSI value and the current RSSI value, specifically comprises:
   using a Mth RSSI value immediately previous to the current RSSI value as the previous RSSI value, and calculating the difference between the previous RSSI value and the current RSSI value, wherein M is a positive integer greater than 1.

6. The BLE-based positioning method according to claim 3, wherein the calculating of a difference between the previous RSSI value and the current RSSI value, specifically comprises:
   using a Mth RSSI value immediately previous to the current RSSI value as the previous RSSI value, and calculating the difference between the previous RSSI value and the current RSSI value, wherein M is a positive integer greater than 1.

7. A Bluetooth low energy (BLE)-based positioning apparatus, applied to a terminal device, the BLE-based positioning apparatus comprising:
a scanning module, configured to scan a target BLE slave device;
a receiving module, configured to receive a signal from the target BLE slave device after the target BLE slave device is scanned;
a parsing module, configured to parse the received signal to obtain a received signal strength indication (RSSI) value;
a first determining module, configured to determine whether the RSSI value is less than a predetermined threshold;
a calculation module, configured to calculate a change rule of the RSSI value when the RSSI value is less than the predetermined threshold; and
a generation module, configured to generate prompt information used for prompting a moving direction of the terminal device according to the change rule of the RSSI value until the RSSI value is greater than or equal to the predetermined threshold;
wherein the generation module comprises:
a first determining sub-module, configured to determine whether the change rule of the RSSI value is that the RSSI value becomes larger;
a prompt sub-module, configured to prompt the terminal device to move in an originally determined direction when the change rule of the RSSI value is that the RSSI value becomes larger; and
an update sub-module, configured to update the change rule of the RSSI value, wherein
the prompt sub-module is further configured to prompt the terminal device to move in another direction when the change rule of the RSSI value is that the RSSI value becomes smaller;
wherein the prompt sub-module comprises:
an obtaining sub-unit, configured to obtain a previous change rule of the RSSI value when the change rule of the RSSI value is that the RSSI value becomes smaller; and
a prompt sub-unit, configured to prompt the terminal device to move in a direction opposite to the originally determined direction when the previous change rule of the RSSI value is that the RSSI value becomes smaller, or prompt the terminal device to move in a direction perpendicular to the originally determined direction when the previous change rule of the RSSI value is that the RSSI value becomes larger.

8. The BLE-based positioning apparatus according to claim 7, wherein the BLE-based positioning apparatus further comprises:

an angle obtaining module, configured to indicate a rotation angle of the terminal device by using a magnetometer or an acceleration sensor.

9. The BLE-based positioning apparatus according to claim 7, wherein the calculation module comprises:
a calculation sub-module, configured to calculate a difference between a previous RSSI value and a current RSSI value;
a second determining sub-module, configured to determine whether the difference is greater than a predetermined value; and
a judging sub-module, configured to determine that the change rule of the RSSI value is that the RSSI value becomes larger when the difference is greater than the predetermined value, while determine that the change rule of the RSSI value is that the RSSI value becomes smaller when the difference is less than the predetermined value.

10. The BLE-based positioning apparatus according to claim 9, wherein the calculation module further comprises:
a filtering algorithm sub-module, configured to process N RSSI values according to a filtering algorithm when the N RSSI values are received, wherein N is a positive integer greater than 1; and
the filtering algorithm processing sub-module is specifically configured to:
calculate an average value of the N RSSI values when N RSSI values are received; or
calculate a median of the N RSSI values when N RSSI values are received; or
calculate an average value or a median of the remaining RSSI values when N RSSI values are received and after the largest value and/or the smallest value is removed from the N RSSI values.

11. The BLE-based positioning apparatus according to claim 10, wherein the calculation sub-module is specifically configured to:
use a Mth RSSI value immediately previous to the current RSSI value as the previous RSSI value, and calculate the difference between the previous RSSI value and the current RSSI value, wherein M is a positive integer greater than 1.

12. The BLE-based positioning apparatus according to claim 9, wherein the calculation sub-module is specifically configured to:
use a Mth RSSI value immediately previous to the current RSSI value as the previous RSSI value, and calculate the difference between the previous RSSI value and the current RSSI value, wherein M is a positive integer greater than 1.

* * * * *